(12) United States Patent
Winkler

(10) Patent No.: US 8,601,922 B2
(45) Date of Patent: *Dec. 10, 2013

(54) PROTECTIVE SYSTEM FOR MACHINE TOOLS

(75) Inventor: Thomas Winkler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 88 days.

This patent is subject to a terminal disclaimer.

(21) Appl. No.: 12/736,229

(22) PCT Filed: Mar. 31, 2009

(86) PCT No.: PCT/EP2009/053768
§ 371 (c)(1),
(2), (4) Date: Dec. 6, 2010

(87) PCT Pub. No.: WO2009/121855
PCT Pub. Date: Oct. 8, 2009

(65) Prior Publication Data
US 2011/0088525 A1    Apr. 21, 2011

(30) Foreign Application Priority Data

Mar. 31, 2008   (DE) .................. 10 2008 000 891

(51) Int. Cl.
*B26D 7/26* (2006.01)
*F16D 51/16* (2006.01)
*F16D 59/00* (2006.01)
*F16P 3/00* (2006.01)

(52) U.S. Cl.
USPC .............................. 83/58; 192/129 R; 188/78

(58) Field of Classification Search
USPC ........ 83/58, 62; 192/129 R; 188/78, 186, 166, 188/184, 185, 189, 180
See application file for complete search history.

(56) References Cited

U.S. PATENT DOCUMENTS

| | | | | |
|---|---|---|---|---|
| 2,047,556 A | * | 7/1936 | Harvey | 188/335 |
| 2,151,151 A | * | 3/1939 | Perez | 475/258 |
| 2,451,373 A | * | 10/1948 | Beall | 49/138 |
| 2,942,711 A | * | 6/1960 | Zindler | 192/105 BA |
| 3,333,821 A | * | 8/1967 | Deppner et al. | 254/378 |
| 3,469,313 A | * | 9/1969 | Martin | 30/122 |
| 3,576,242 A | * | 4/1971 | Mumma | 193/35 A |
| 3,858,095 A | * | 12/1974 | Friemann et al. | 192/129 A |
| 4,531,617 A | | 7/1985 | Martin et al. | |
| 5,105,925 A | | 4/1992 | Tremaglio et al. | |
| 6,213,258 B1 | * | 4/2001 | Dupuis | 188/79.53 |

FOREIGN PATENT DOCUMENTS

| | | |
|---|---|---|
| CN | 101980826 | 2/2011 |
| DE | 2 147 669 | 4/1972 |
| DE | 87 08 955 | 12/1987 |
| DE | 195 36 995 | 4/1997 |

* cited by examiner

*Primary Examiner* — Ghassem Alie
(74) *Attorney, Agent, or Firm* — Kenyon & Kenyon LLP

(57) ABSTRACT

An emergency brake system for abrupt braking of a revolving shaft of a machine tool includes at least one brake drum and at least one brake shoe that are brought into engagement with one another in order to brake the shaft. The braking engagement between the brake drum and brake shoe occurs under the influence of a centrifugal force resulting from rotation of a shaft, the brake system being self-reinforcing, in particular self-locking.

12 Claims, 6 Drawing Sheets

PROTECTIVE SYSTEM FOR MACHINE TOOLS

BACKGROUND OF THE INVENTION

1. Field of the Invention

The present invention relates to a protective system for a machine tool, e.g., for a circular saw, which system affords its protective effect within a very short time span that is usually in the range of a few milliseconds, in order to protect a user of the machine tool from injury in hazardous situations.

2. Description of Related Art

There exist at present substantially three different approaches to implementing a protective system of this kind for table saws and format circular saws, which is intended to prevent a user from coming into contact with the revolving saw blade or suffering a serious cut injury therefrom.

The protective system, offered and marketed under the company name Saw Stop Inc., of an American manufacturer involves an emergency brake system that enables braking of the machine tool on the basis of direct engagement of a brake actuation system with the saw blade as soon as a correspondingly configured sensor has detected a hazardous situation. By the use of a heated-wire trigger, a rotatably disposed aluminum block is pushed with the aid of a preloaded spring into the teeth of the running saw blade, which wedges itself thereinto and in that fashion absorbs the rotation energy of all the machine tool geometries that revolve during the sawing operation. As a side effect, this one-sided application of force onto the cutting edges is used to recess the saw blade into the saw table by way of a specially designed suspension system disposed on the saw table. This assemblage makes it possible to avert serious bodily damage to the operator of the machine tool who triggers the protective mechanism. A disadvantage in this context is the direct action on the machining tool, i.e. the cutting geometry of the saw blade, since an additional hazard potential for the user arises because parts of the tooth set break away. In addition, restoring the readiness of the protective system requires exchanging the brake unit, including the saw blade, for a replacement unit that is ready for use and that the user must keep on hand in order to continue working after a braking operation involving utilization of the protective function has occurred. This is associated with considerable consequential costs and a corresponding outlay of time for acquisition and installation. It can furthermore be assumed that all the components affected by the braking operation, i.e. all the revolving geometries of the machine tool, will be exposed to large stresses during the deceleration phase. Neither the manufacturer nor corresponding publications about this system provide data regarding the long-term durability of the system.

A further approach involves use of a protective system exclusively for lowering the saw blade into the saw table, without initiating a saw blade braking operation. Here the saw blade, including the main shaft and its bearing system, is removed from the hazard zone with the aid of a pyrotechnic initiating charge, so that serious injuries to the user can be prevented. This type of protective system is disadvantageous in that it requires relatively large masses, in the form of the assemblages to be lowered, to be moved under strict time constraints on the order of milliseconds. The pyrotechnic initiators necessary as a result, which turn out to be indispensable for this protective actuation suite, moreover produce an expensive partial reversibility that limits, in terms of both time and organization, immediate continuation of work on the machine tool with a protective system that is ready to use. In addition, for reasons of limited installation space and a very specific procedure, this protective system is suitable only for larger stationary units, for example table saws, which allow this kind of construction in their interior. This system is, however, not qualified for use on smaller manually guided units, for example cutoff and miter saws or panel saws.

A publication from a publicly funded project called "Cut-Stop" (VDI/VDE/IT) regarding a protective system for format saws from the Institute for Machine Tools (IFW) of the University of Stuttgart describes an approach that brings the main shaft of the machine tool, and thus the saw blade, to a standstill using a special form of a disk brake system, namely a self-reinforcing wedge brake. A wedge is accelerated with the aid of a pyrotechnic initiator and then pushed between a stationary wedge guide in the shape of a modified brake caliper, and the rotating brake disk. The assemblage acts in self-locking fashion for a specific selection and combination of wedge angle $\alpha$ and brake lining values $\mu$, so that the particular time-related requirements for the braking operation, depending on the inertia to be decelerated, can be met with this configuration. The disadvantage of this protective system, however, is that here as well, as described in the publication cited, a replacement of the entire brake unit is necessary subsequent to triggering of the protective actuator system, because of the wedge that jams into the friction pair. The time required to perform the work involved is approximately 10 to 12 minutes for complete system readiness to be restored. A partial limitation of immediate system reversibility therefore exists here as well.

Published German patent document DE 195 36 995 A1 discloses a safety brake for elevators which has a device that, when the transport means exceeds a predefined maximum velocity, brakes (and optionally also arrests) the drive system with a velocity-related deceleration. The safety brake of published German patent document DE 195 36 995 A1 acts in rotation-speed-dependent fashion directly on the traction sheave of the cable-operated conveying system, and allows its rotation speed to be limited. The safety brake, embodied as a centrifugal brake, additionally has a device for amplifying the braking force as a function of the conveying speed.

Proceeding from this existing art, it is an object of the present invention to create a protective system of a machine tool having an alternative configuration, which system affords its protective effect within a few milliseconds and at least partly eliminates the problems described above.

BRIEF SUMMARY OF THE INVENTION

To achieve this object, the present invention provides an emergency brake system for abruptly braking a revolving shaft of a machine tool, the emergency brake having a brake drum and at least one brake shoe that are brought into engagement with one another in order to brake the shaft. According to the present invention, the brake drum and the at least one brake shoe are embodied and disposed in such a way that the braking engagement between the brake drum and brake shoe occurs under the influence of the centrifugal force or centrifugal acceleration resulting from rotation of the shaft. The braking system is embodied according to the present invention in self-reinforcing, in particular self-locking fashion.

The reinforcement factor C* of the brake system is defined as a function of the geometric dimensions of its design, this factor being in the range of system self-reinforcement or self-locking for the present configuration. For this instance of self-reinforcement or self-locking of the brake system, advantageously only a short pulse is required in order to produce the friction pair, since the brake shoes are pressed against the brake drum as a result of the force equilibrium that occurs.

This advantageously enables braking times that are once again much shorter than those of a brake driven only by centrifugal force.

The present invention is therefore directed toward implementing deceleration of the revolving shaft of the machine tool, which can be e.g. a table saw, a cutoff or miter saw, or a panel saw, using the existing rotational energy of the revolving shaft thanks to the creation of a self-reinforcing or self-locking friction pair. The predefined braking time frame, which is in the range of a few milliseconds, can thereby be guaranteed. The configuration according to the present invention of the brake allows a tool, driven directly or indirectly by a shaft, to be braked within very short times, which are typically in the range from 1 to 50 ms, advantageously in the range from 1 to 20 ms, and in particular in the range of 10 ms and less.

Advantageously, there is no direct intervention on the tool in the context of braking of the machine tool. Any such intervention would inevitably be associated with destruction of the tool. The machine tool according to the present invention brakes the shaft that direct or indirectly drives the tool. In this fashion, the tool itself remains undamaged.

In addition, the configuration according to the present invention implements an electromechanical system without using further forms of energy, which in some circumstances jeopardize complete reversibility and would mean a limitation thereof.

It should be clear in this context that triggering of the braking operation, which occurs, for example, as a response to an output signal of a sensor that detects a hazardous situation for the user, can be accomplished mechanically, electromechanically, pyrotechnically, pneumatically, or hydraulically, and in principle is not linked to any specific medium, although electromagnetic triggering is preferred because of a simple configuration and very good reversibility.

According to an embodiment of the present invention, the at least one brake shoe is secured pivotably on a brake shoe carrier that is arranged on a revolving shaft and revolves with it. A retaining device is preferably provided, which is displaceable between a retained position in which the brake shoe is held against the brake shoe carrier, and a disengaged position in which the at least one brake shoe is released in such a way that it executes a pivoting motion toward the brake drum in order to generate the brake engagement. In other words, the at least one brake shoe rotating with the revolving shaft is abruptly moved within a few milliseconds toward the stationary brake drum, utilizing the centrifugal force of the revolving shaft, as soon as the retaining device is transferred into its disengaged position.

The retaining device preferably encompasses at least one interlock element that is movable between a retained position in which it is in engagement with at least one brake shoe, and a disengaged position in which it is decoupled from the brake shoe. An interlock element of this kind can be embodied, for example, as an interlock bolt or the like.

The retaining device advantageously encompasses an actuator that transfers the retaining device from the retained position into the disengaged position. This actuator can be, for example, a magnetic actuator that pulls an annular armature on which is secured an interlock element in the form of an interlock bolt, in order to shift the interlock bolt out of the brake shoe so that the latter is released.

The emergency brake furthermore preferably encompasses a coupling device whose nature is such that in its coupled position it connects the shaft to be braked to a drive train, and such that during an emergency braking operation it is automatically transferred into its decoupled position in which the drive shaft to be braked is decoupled from the drive train. This decoupling of the drive train during an emergency braking operation ensures that the drive train, which can have, for example, a drive shaft and any conversion ratio stages, is excluded from the actual braking operation; the result is that the drive train is not exposed to the large deceleration torques that occur during the braking operation. This on the one hand provides the advantage that components of the drive train cannot be damaged as a result of the braking operation. On the other hand, the geometries of the drive-side components do not need to be adapted, in terms of design, to the requirements of the braking operation, and they can therefore be produced in less robust and more economical fashion. Also resulting from this is a beneficial reduction in the moment of inertia that must be decelerated, since the components of the drive train do not need to be braked. The system load during the deceleration phase can thus be decisively reduced. The elapsed time necessary for the saw blade braking operation can correspondingly be shortened for an equivalent force application. Alternatively, of course, the force application can be decreased with no change in the elapsed braking time.

According to an example embodiment, the shaft to be braked is embodied as a hollow shaft in whose cavity a drive shaft of the drive train is positioned. The coupling device is advantageously constituted, in this context, by a projection provided on the at least one brake shoe, which projection, in the coupled position, engages through a passthrough opening provided in the shaft to be braked and into a cutout of the drive shaft so that the drive shaft and the shaft to be braked are nonrotatably connected to one another, and in the decoupled position comes out of engagement with the cutout of the drive shaft so that the shaft to be braked is no longer being driven by the drive shaft. A decoupling of the drive train during the braking operation can be implemented in this fashion. The projection is preferably in positive engagement with the cutout, thereby achieving a more secure engagement of the projection in the cutout. The projection can be embodied for this purpose, for example, in arc-shaped fashion, and the cutout as a prismatic shape.

Be it noted at this juncture that the number of projections need not correspond to the number of cutouts. For example, four cutouts and only two projections can be provided. This is advantageous because after a triggering of the emergency brake system, the drive shaft needs to be rotated only slightly in order to dispose the projections once again in a pair of cutouts. It is also possible to provide more than two brake shoes, only two of which, however, need to be immobilized on the drive shaft by way of corresponding connections constituted by a projection and a cutout.

The emergency brake system according to the present invention furthermore preferably has a reset device for moving the at least one brake shoe back into its initial position in order to ensure complete system reversibility after a braking operation has occurred. The reset device is designed, in this context, in close coordination with the self-reinforcing of the friction pair and thus with the geometry of the brake system. The reset device can be implemented, for example, by the use of correspondingly dimensioned spring elements working in both tension and compression.

The present invention moreover refers to a machine tool having an emergency brake system of the kind described above, the machine tool preferably being a circular saw, more precisely a table saw, a cutoff and miter saw, or a panel saw.

It should be clear, however, that the brake system according to the present invention is also applicable to other machine tools that are dependent, upon specific authorization, on deliberately triggerable deceleration within a defined time frame in the range of a few milliseconds. Adaptation of this invention to another machine tool in an individual case is thus possible in principle.

DETAILED DESCRIPTION OF THE INVENTION

Figure 1:
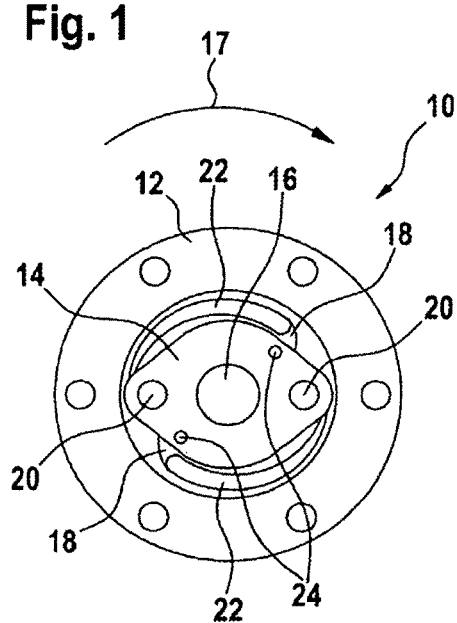
FIG. 1 is a schematic front view of an emergency brake system in accordance with an embodiment of the present invention, in a state in which the braking operation has not been triggered.
Figure 2:
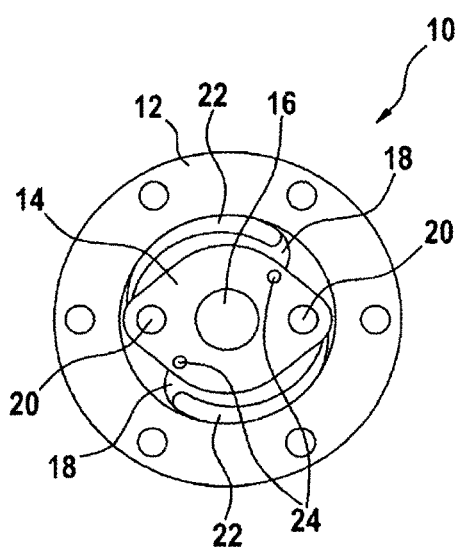
FIG. 2 is a schematic front view of the emergency brake system depicted in FIG. 1, in a state in which the braking operation has been triggered.

FIGS. 1 to 6 are schematic views of an emergency brake system in accordance with an embodiment of the present invention, which system is labeled generally with the reference character 10 and serves to bring, for example, a saw blade of a table saw (not shown here, see instead FIG. 11) to a standstill in a hazardous situation within a very short period of time that is in the range of a few milliseconds. Emergency brake system 10 encompasses a stationary brake drum 12 that is secured on a frame component (not depicted further) of the table saw. The design of this frame component must be such that it can withstand and absorb the braking torques occurring during the deceleration phase. Emergency brake system 10 further encompasses a brake shoe carrier 14 that is fixedly connected to a saw-blade-side output shaft 16 so that it revolves with the latter in the rotation direction characterized by arrow 17. Mounted on brake shoe carrier 14 are two brake shoes 18, located diametrically opposite one another, that are each mounted rotatably about a pivot bolt 20. Brake shoes 18 are each equipped, on their surface facing toward brake drum 12, with a friction lining 22; during a braking operation of emergency brake system 10, these friction linings 22 come into engagement with the stationary brake drum 12 so that friction linings 22 and brake drum 12 form a friction pair. In the state depicted in FIG. 1, in which the braking operation has not yet been triggered, brake shoes 18 are held fixedly on brake shoe carrier 14 with the aid of interlock bolts 24, so that they cannot rotate about pivot bolts 20.

Figure 3:
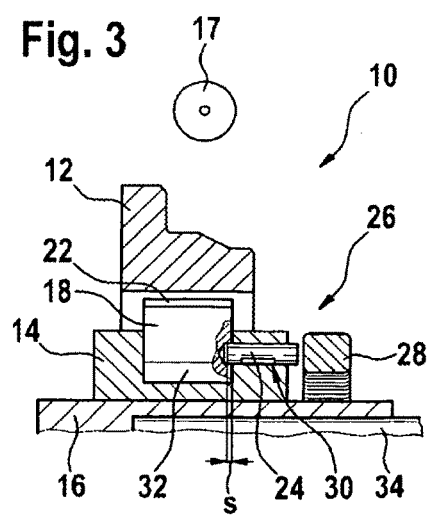
FIG. 3 is a longitudinal sectioned view of the emergency brake system depicted in FIGS. 1 and 2, in a state in which the braking operation has not been triggered.

These interlock bolts 24 are part of a retaining device 26 that further has a magnetic actuator 28 with which interlock bolts 24 are displaceable between a retained position in which brake shoes 18 are held against brake shoe carrier 14, and a disengaged position in which brake shoes 18 are released in such a way that they execute a pivoting motion about their pivot bolts 20 toward brake drum 12, in order to generate the braking engagement between friction linings 22 and brake drum 12. As shown in FIG. 3, magnetic actuator 28 of retaining device 26 is secured fixedly on output shaft 16. Alternatively, magnetic actuator 28 can also be secured on a stationary housing part (not depicted) and can act in non-contact fashion on interlock bolts 24. Interlock bolts 24, which are movable back and forth by magnetic actuator 28, extend through passthrough openings 30 provided in brake shoe carrier 14 and, in the state depicted in FIGS. 1, 3, and 5 in which the braking operation has not yet been initiated, engage into engagement openings 32 that are respectively provided in brake shoes 18. Brake shoes 18 are thereby immobilized on brake shoe carrier. In the event of a triggering of the brake system, magnetic actuator 28 pulls an annular armature, on which interlock bolts 24 are secured, a defined shift distance s out of brake shoe carrier 14 and thus releases brake shoes 18 (see FIG. 4). The latter, as a result of the centrifugal force or centrifugal acceleration generated by the revolving output shaft 16, are applied against the stationary brake drum 12, thereby forming between friction linings 22 of brake shoes 18 and brake drum 12 the friction pair necessary to decelerate output shaft 16. Although in the present exemplifying embodiment interlock bolts 24 are moved back and forth with the aid of magnetic actuator 28, be it noted that interlock bolts 24 can also alternatively be moved in one of the two motion directions by the action of a spring force or the like. For example, the forward motion of interlock bolts 24 can occur under the influence of magnetic actuator 28, while interlock bolts 24 are returned by way of one or more spring elements, or vice versa.

Figure 4:
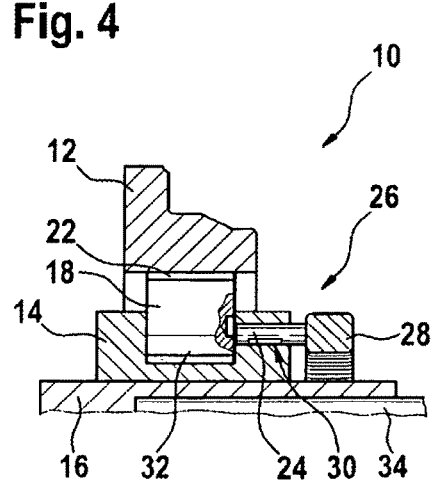
FIG. 4 is a schematic longitudinal sectioned view of the emergency brake system depicted in FIGS. 1 to 3, in a state in which the braking operation has been triggered.
Figure 5:
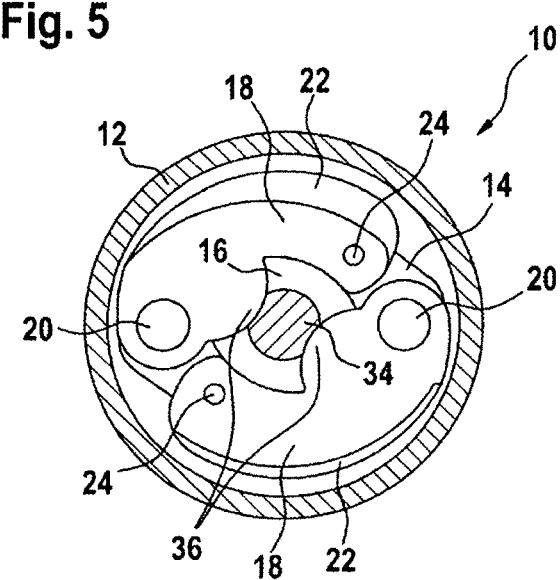
FIG. 5 is a schematic cross-sectional view of the emergency brake system depicted in FIGS. 1 to 4, in a state in which the braking operation has not been triggered.
Figure 6:
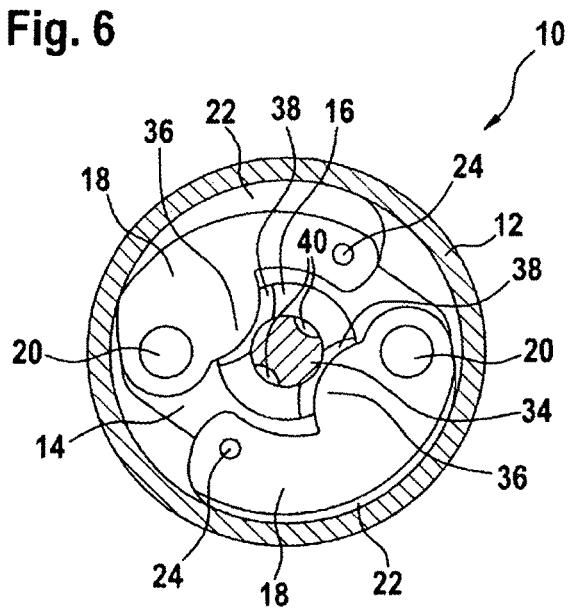
FIG. 6 is a schematic cross-sectional view of the emergency brake system depicted in FIGS. 1 to 5, in a state in which the braking operation has been triggered.

As is evident in particular from FIGS. 3 and 4, drive shaft 16 that is to be braked with the aid of emergency brake system 10 is embodied as a hollow shaft in whose cavity is received a drive shaft 34 that forms part of the drive train (not depicted further). In order to connect output shaft 16 and drive shaft 34 nonrotatably to one another, arc-shaped projections 36 protruding toward the center point of drive shaft 16 and of drive shaft 34 are embodied on brake shoes 18, and each engage through passthrough openings 38 provided in output shaft 16 and engage into prism-shaped cutouts 40 of drive shaft 34, as depicted in FIG. 5. As a result of the engagement of projections 36, provided on brake shoes 18, into the corresponding cutouts 40 of drive shaft 34, output shaft 16 and drive shaft 34 are nonrotatably connected to one another. When the braking operation is initiated starting from the state depicted in FIG. 5, once interlock bolts 24 have been pulled the shift distance s out of brake shoes 18, brake shoes 18 then rotate about their respective pivot bolts 20 toward brake drum 12, so that projections 36 disposed on brake shoes 18 come out of engagement with the associated cutouts 40 of drive shaft 34, with the result that drive shaft 34 is decoupled from output shaft 16. Because of this decoupling, the drive train is not exposed to the deceleration torques generated during the braking operation, so that it cannot be damaged. It is also possible to configure the drive train components less robustly, since they are not subject to large stresses during the braking operation. For example, the cross section of the motor-side drive shaft 34 can be made smaller than in the case in which a decoupling device is not provided in order to decouple the drive train. The critical advantage arising therefrom is, however, that the number of components to be decelerated is reduced to a minimum. This has a positive effect on system loading during the deceleration phase, as has already been described above.

The reinforcement factor C* of the brake system is defined as a function of the geometric dimensions of its design, this factor being in the range of system self-reinforcement or self-locking for the present configuration. For this instance of self-reinforcement or self-locking of the system, only a short pulse is required in order to produce the friction pair, since brake shoes 18 are pressed against brake drum 12 as a result of the force equilibrium that occurs.

A design that can implement this reinforcement factor will be elucidated in more detail below.

Figure 7:
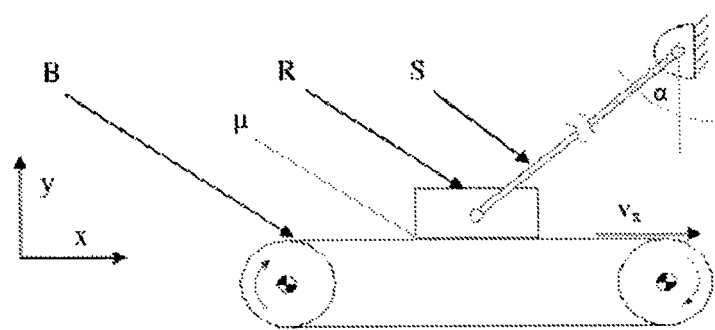
FIG. 7 schematically depicts a model for self-reinforcement of the braking effect.

Because of the critical time parameters of the aforesaid brake system, it appears useful, among other things, to select a concept that enables application of the technical principle of self-assistance. This means that the clamping force $F_{Sp}$ applied for triggering is amplified several times within the system; the reaction force $F_{Reakt}$ that is generated, here in the form of a frictional force $F_R$, contributes in turn to an increase in the clamping force $F_{Sp}$ that is introduced. This property is also referred to as self-reinforcement or the servo effect. Systems characterized thereby furnish, in principle, the shortest possible deceleration times using low clamping forces, so that both the mass of the triggering members and the requisite triggering time $t_A$ can be minimized. The basic model of such an assemblage is depicted schematically in FIG. 7. in order to show the relationships.

Figure 8:
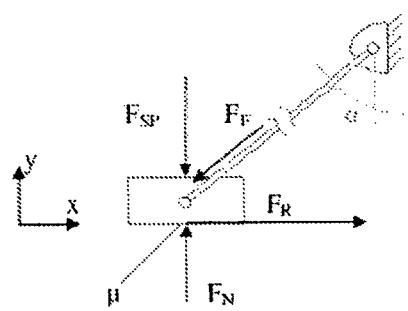
FIG. 8 is a detail of the schematic depiction according to FIG. 7, to illustrate the forces that are acting.

Here a friction block R is placed on a belt B circulating at a constant velocity $v_x$. A pivotably mounted support rod S, which is held at an incidence angle α with reference to the vertical, serves to define the position of the friction block horizontally and guides R with respect to the frame. Sliding friction exists between the block and running band in the operating state. The forces on the unconstrained block are evident from FIG. 8, the symbols being as follows:

FSP=clamping force

FF=spring force of support rod

FN=normal force

FR=resulting frictional force

The equations for force equilibrium are thus $$F_F \cdot \sin \alpha + F_R = 0$$

$$F_F \cdot \cos \alpha + F_N - F_{SP} = 0$$

$$F_R = F_N \cdot \mu.$$

From which the relationship between the frictional and clamping force can be derived:

$$F_{SP} = F_R \left( \frac{1}{\mu} - \frac{1}{\tan \alpha} \right)$$

For an angle α=90°, as intuition confirms, the Coulomb friction law applies.

The reinforcement factor can further be defined as follows:

$$C^* = \frac{F_R}{F_{SP}} = \frac{\mu \cdot \tan \alpha}{\tan \alpha - \mu}$$

If the factor C* is positive, the forces then act in the direction assumed in the sketch. The frictional force $F_R$ is determined here by the clamping force $F_{Sp}$ amplified by the factor C*. For μ=tan α, the equation for C* has one pole, so that this reinforcement factor approaches infinity. In this regard the system state that exists is, in practice, a labile equilibrium. If the parameter choice is tan α<μ, a negative reinforcement factor C* results. This means a theoretical reversal of the direction of clamping force $F_{Sp}$ that would have to occur in order to maintain the force equilibrium. In reality, this case characterizes a specific state of a self-reinforcing system. The friction block is in this instance additionally pressed against the belt by the resulting frictional force F. Ideally, because of the constant mutual enhancement of the frictional and normal forces that thus results, adhesive friction soon occurs within the friction pair. This consequently leads to blockage of the entire system; the term commonly used in this connection is "self-locking." The forces occurring here are, advantageously, greater than the forces transmitted by the centrifugal force of the brake shoes.

Depending on the relative frictional coefficients μ of the friction partners, angles α are obtained which describe ranges in which self-reinforcement or self-locking takes place.

The configuration of the emergency brake system according to the present invention, and the reinforcement factor resulting from the geometry of the system, will now be explained with reference to FIGS. 9 and 10.

Figure 9:
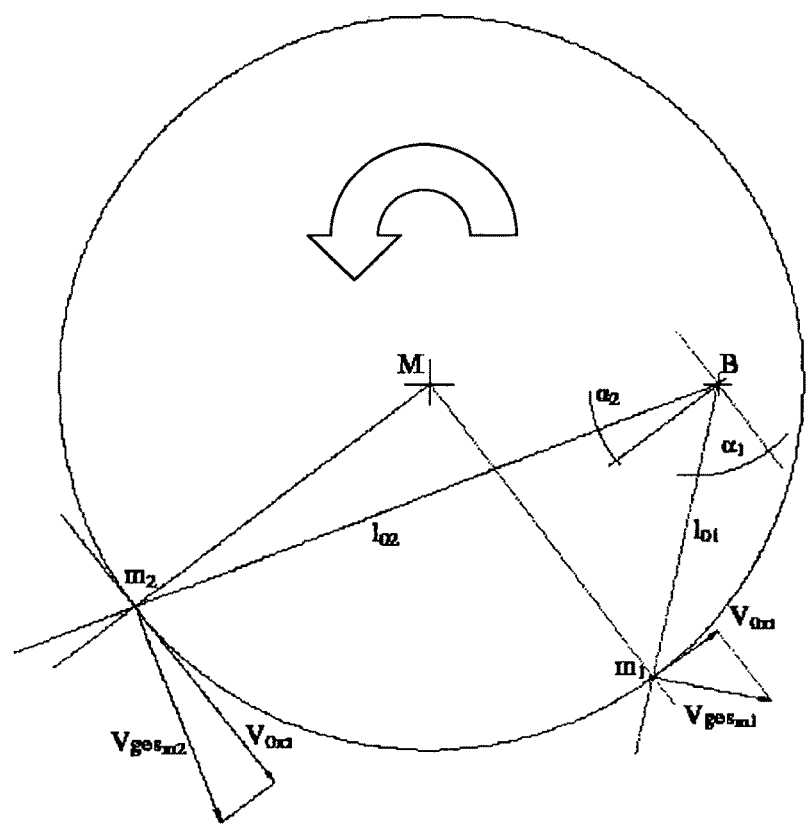
FIG. 9 is a graphic overview of initial velocities of various mass points of the brake shoe of the brake system according to the present invention.

In FIG. 9, the application velocity $v_{0x}$ of the brake linings against the brake drum is ascertained qualitatively for two randomly selected points $m_1$, $m_2$ on the drum circumference. These represent mass points of the friction linings, which are pivotable about point B. The velocity component $v_{0x}$ is always oriented at right angles to the circular arc, and a change in direction thus takes place tangentially to the drum.

The angles $α_1$ and $α_2$ are plotted for the respective points $m_1$, $m_2$, the change in incidence of the two mass points with respect to point B on a notional housing being visible. As described above, a smaller incidence angle $α_2$ is more favorable for achieving high self-reinforcement or even self-locking for a specific frictional value μ. For this reason, the point $m_2$ will always have a greater influence on the reinforcement factor C* of the overall system if the design goal is self-locking. In this case a self-locking region is produced at the front end of brake shoe 18, or of friction lining 19 of that brake shoe.

Figure 10:
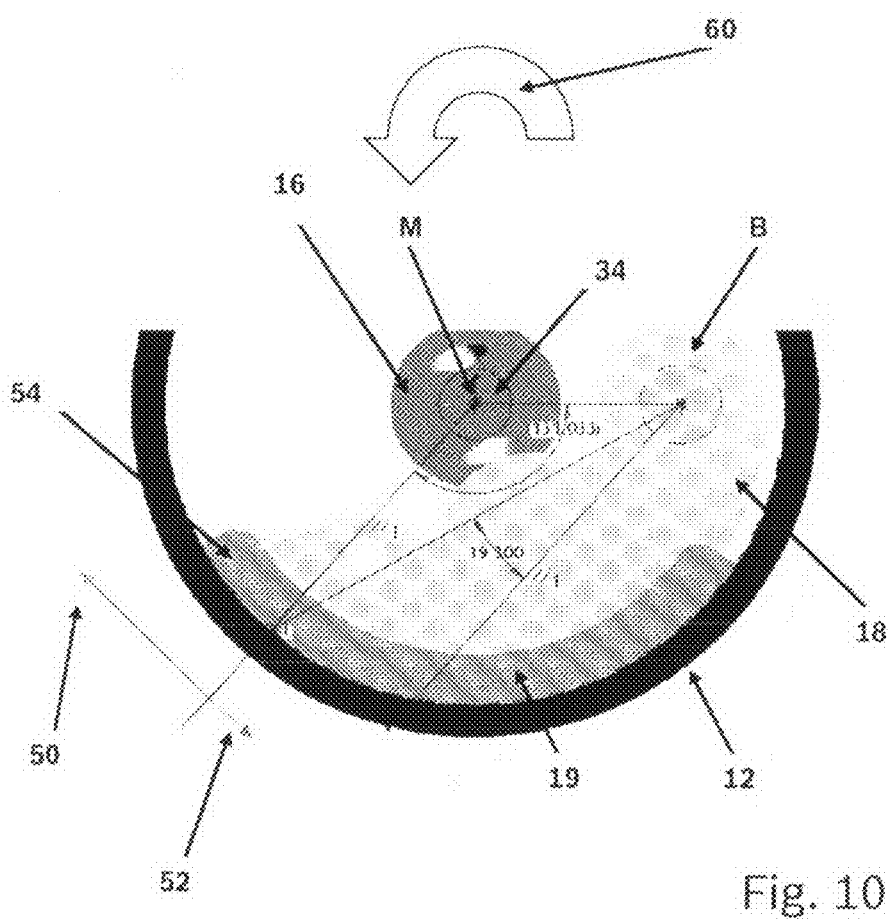
FIG. 10 schematically depicts the brake system in order to illustrate the frictional characteristics of the centrifugal-force brake according to the present invention.

FIG. 10 provides an overview of the frictional relationships with the brake system. It is assumed that the angle α=19.3° selected here represents the point of labile equilibrium C*=±∞; this therefore corresponds to a minimum frictional value μ=0.35 for the friction pairing that must be present in order to constitute, in the direction of arrow 50, a self-locking zone for the friction lining. In the direction of arrow 52, the friction pair is self-reinforcing.

It may be advantageous in this context to configure the friction lining of at least one friction partner or braking partner inhomogeneously. For example, it would be possible to compensate for the increase in angle α in the direction of arrow 54 by increasing the relative frictional coefficient μ of the friction partners in that direction; this could be implemented, for example, by way of an inhomogeneous friction lining on the brake shoe.

The time interval for the braking operation triggering time can be greatly shortened as a result of the above-described configuration of emergency brake system 10, since the braking engagement between brake drum 12 and brake shoes 18 occurs under the influence of the centrifugal force or centrifugal acceleration that results from the rotation of output shaft 16. There is furthermore a self-reinforcing and even self-locking braking action effect, so that the braking effect can be enhanced and braking times can be advantageously shortened.

Thanks to the use of a double-sided application of the circumferential frictional force of the friction pair, there is little stress on the rolling bearings used in the present case and they do not need to be revised or even entirely redesigned as a result of effects on the long-term durability of the overall system, which in turn would introduce greater inertia into the system.

A configuration such as the one described above moreover avoids revolving external geometries in the brake unit, with the result that an easily encapsulated closed system with a compact configuration can be achieved; this additionally has the positive effect of compatibility with the specific requirements of industrial protection when working with machine tools.

It should be clear that the actuation of magnetic actuator 28 is accomplished by way of output signals of corresponding sensors, which sense a state in which a user is coming dangerously close to the saw blade of the table saw or will touch it. Such sensors are known in the existing art, and therefore will not be discussed further in the present description.

Figure 11:
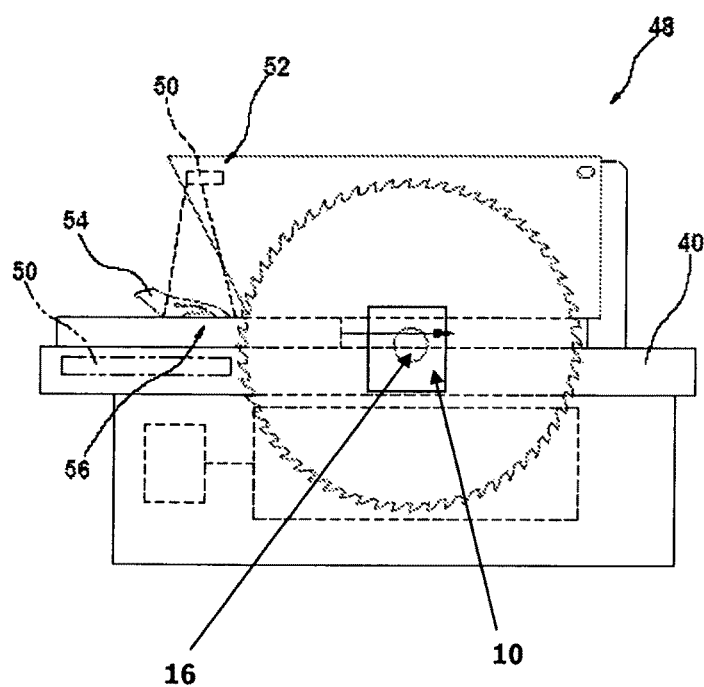
FIG. 11 shows an exemplifying embodiment of a machine tool according to the present invention in the form of a table saw.

FIG. 11 shows an exemplary embodiment of a machine tool according to the present invention, having an emergency braking system 10 and a sensor system for detecting the presence of a type of material. Circular saw 48 is a circular-saw bench (benchtop system), and has a workbench 69, and has a detection device 62 which is provided to detect the presence of a material type 64, particularly of tissue, for example, in a machine-tool working area 56. Device 62 for the detection has at least one sensor 60 that may be installed in a plane above the working area of the machine tool.

Even though a circular saw was selected as an example of a machine tool in the embodiment described above, it should be clear that the principle of the present invention is also applicable to other machine tools.

Lastly, it should be clear that the above-described embodiment of the emergency brake system according to the present invention is in no way limiting. Instead, modifications and changes are possible without departing from the range of protection of the present invention, which range is defined by the accompanying claims.

What is claimed is:

1. An emergency braking system for abrupt braking a revolving shaft of a machine tool, comprising:
   a brake drum; and
   at least one brake shoe configured to be selectively engaged with the brake drum in order to brake the shaft;
   wherein the brake drum and the at least one brake shoe are configured in such a way that braking engagement between the brake drum and the brake shoe takes place under the influence of a centrifugal force resulting from the rotation of the shaft,
   wherein the abrupt braking is within 50 ms, and
   wherein the brake drum and the at least one brake shoe are configured in such a way that the braking system is self-locking by selecting incidence angles based on relative frictional coefficients of the brake drum and the at least one brake shoe.

2. The emergency braking system as recited in claim 1, wherein upon braking engagement between the brake drum and the brake shoe, at least one region possessing self-locking properties is constituted on the at least one brake shoe.

3. The emergency braking system as recited in claim 2, wherein at least one of the brake drum and the at least one brake shoe has a friction lining.

4. The emergency braking system as recited in claim 3, wherein the at least one brake shoe is secured pivotably on a brake shoe carrier disposed on the shaft and revolves with the shaft.

5. The emergency brake system as recited in claim 4, further comprising:
   a retaining device configured be switched between a retained position and a disengaged position,
   wherein the at least one brake shoe is held against the brake shoe carrier in the retained position, and
   wherein the at least one brake shoe is released in the disengaged position in such a way that the at least one brake shoe executes a pivoting motion toward the brake drum in order to generate the braking engagement.

6. A machine tool having an emergency braking system as recited in claim 1.

7. The machine tool as recited in claim 6, wherein the machine tool is a saw.

8. An emergency braking system for abrupt braking a revolving shaft of a machine tool, comprising:
   a brake drum;
   at least one brake shoe configured to be selectively engaged with the brake drum in order to brake the shaft;
   a retaining device configured be switched between a retained position and a disengaged position;
   wherein the brake drum and the at least one brake shoe are configured in such a way that braking engagement between the brake drum and the brake shoe takes place under the influence of a centrifugal force resulting from the rotation of the shaft,
   wherein the brake drum and the at least one brake shoe are configured in such a way that the braking system is self-locking,
   wherein upon braking engagement between the brake drum and the brake shoe, at least one region possessing self-locking properties is constituted on the at least one brake shoe,
   wherein at least one of the brake drum and the at least one brake shoe has a friction lining,
   wherein the at least one brake shoe is secured pivotably on a brake shoe carrier disposed on the shaft and revolves with the shaft,
   wherein the at least one brake shoe is held against the brake shoe carrier in the retained position,
   wherein the at least one brake shoe is released in the disengaged position in such a way that the at least one brake shoe executes a pivoting motion toward the brake drum in order to generate the braking engagement, and
   wherein the retaining device has at least one interlock element configured to be movable between the retained position and the disengaged position, wherein the interlock element is in engagement with the at least one brake shoe in the retained position, and wherein the interlock element is decoupled from the at least one brake shoe in the disengaged position.

9. The emergency brake system as recited in claim 8, wherein the retaining device has an actuator configured to switch the retaining device from the retained position to the disengaged position.

10. The emergency braking system as recited in claim 9, further comprising:

a reset device configured to move the at least one brake shoe back to original starting position.

11. The emergency braking system as recited in claim 10, wherein the reset device has at least one spring element.

12. An emergency braking system for abrupt braking a revolving shaft of a machine tool, comprising:

a brake drum;

at least one brake shoe configured to be selectively engaged with the brake drum in order to brake the shaft;

a coupling device, wherein in a coupled position the coupling device connects the shaft to a drive train, wherein the brake drum and the at least one brake shoe are configured in such a way that braking engagement between the brake drum and the brake shoe takes place under the influence of a centrifugal force resulting from the rotation of the shaft, wherein the brake drum and the at least one brake shoe are configured in such a way that the braking system is self-locking, wherein upon braking engagement between the brake drum and the brake shoe, at least one region possessing self-locking properties is constituted on the at least one brake shoe, wherein at least one of the brake drum and the at least one brake shoe has a friction lining, wherein the at least one brake shoe is secured pivotably on a brake shoe carrier disposed on the shaft and revolves with the shaft, and wherein during an emergency braking operation the coupling device is configured to be automatically switched to a decoupled position in which the drive shaft is decoupled from the drive train.

\* \* \* \* \*

UNITED STATES PATENT AND TRADEMARK OFFICE
CERTIFICATE OF CORRECTION

PATENT NO. : 8,601,922 B2
APPLICATION NO. : 12/736229
DATED : December 10, 2013
INVENTOR(S) : Thomas Winkler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 156 days.

Signed and Sealed this
Twenty-second Day of September, 2015

Michelle K. Lee
*Director of the United States Patent and Trademark Office*